United States Patent
Hirai et al.

(10) Patent No.: US 12,020,486 B2
(45) Date of Patent: Jun. 25, 2024

(54) INFORMATION PROCESSING DEVICE, IN-VEHICLE CONTROL DEVICE, AND VEHICLE CONTROL SYSTEM

(71) Applicant: Hitachi Astemo, Ltd., Hitachinaka (JP)

(72) Inventors: Riu Hirai, Tokyo (JP); Goichi Ono, Tokyo (JP); Hiroaki Ito, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 428 days.

(21) Appl. No.: 17/413,264

(22) PCT Filed: Dec. 10, 2019

(86) PCT No.: PCT/JP2019/048288
§ 371 (c)(1),
(2) Date: Jun. 11, 2021

(87) PCT Pub. No.: WO2020/122067
PCT Pub. Date: Jun. 18, 2020

(65) Prior Publication Data
US 2022/0051030 A1    Feb. 17, 2022

(30) Foreign Application Priority Data
Dec. 12, 2018    (JP) ................................ 2018-232687

(51) Int. Cl.
*G06K 9/00*    (2022.01)
*G06N 3/02*    (2006.01)
*G06V 20/56*    (2022.01)

(52) U.S. Cl.
CPC ............. *G06V 20/56* (2022.01); *G06N 3/02* (2013.01)

(58) Field of Classification Search
CPC ................................ G06V 20/56; G06N 3/02
See application file for complete search history.

(56) References Cited

U.S. PATENT DOCUMENTS

2007/0244842 A1    10/2007    Ishii et al.
2017/0091581 A1    3/2017    Watanabe et al.
(Continued)

FOREIGN PATENT DOCUMENTS

JP    2005-346472 A    12/2005
JP    2017-68577 A    4/2017
(Continued)

OTHER PUBLICATIONS

Japanese-language Office Action issued in Japanese Application No. 2018-232687 dated Jul. 5, 2022 with English translation (10 pages).
(Continued)

*Primary Examiner* — David F Dunphy
(74) *Attorney, Agent, or Firm* — Crowell & Moring LLP

(57) ABSTRACT

An information processing device includes a DNN operation unit that executes a DNN operation by a neural network including plural layers and a weight storage unit that stores a weight used in the DNN operation, and the DNN operation unit specifies data having a value larger than a predetermined threshold as operation target data among data input to a predetermined layer of the neural network, acquires a weight corresponding to the operation target data from the weight storage unit, and executes an operation of the predetermined layer based on the operation target data and the weight acquired from the weight storage unit.

7 Claims, 11 Drawing Sheets

(56) References Cited

U.S. PATENT DOCUMENTS

| | | |
|---|---|---|
| 2018/0096245 A1 | 4/2018 | Toba et al. |
| 2018/0114110 A1* | 4/2018 | Han ........................ G06N 3/063 |
| 2018/0253636 A1 | 9/2018 | Lee et al. |
| 2018/0330235 A1 | 11/2018 | Lin et al. |
| 2019/0130277 A1* | 5/2019 | Andoni .................. G06N 3/086 |
| 2020/0025935 A1* | 1/2020 | Liang ..................... G06V 20/64 |
| 2020/0159529 A1* | 5/2020 | Sen ........................ G06F 9/3887 |
| 2020/0160185 A1* | 5/2020 | Praveen ................. G06N 3/045 |

FOREIGN PATENT DOCUMENTS

| | | |
|---|---|---|
| JP | 2018-60268 A | 4/2018 |
| WO | WO 2018/080624 A1 | 5/2018 |

OTHER PUBLICATIONS

International Search Report (PCT/ISA/210) issued in PCT Application No. PCT/JP2019/048288 dated Mar. 3, 2020 with English translation (seven (7) pages).

Japanese-language Written Opinion (PCT/ISA/237) issued in PCT Application No. PCT/JP2019/048288 dated Mar. 3, 2020 (seven (7) pages).

Shimada, N., et al., "Introduction to Deep Learning with Chainer", First edition, Tokyo: Gijutsu-Hyohron Co., Ltd., Sep. 27, 2017, pp. 2-4, 50 with English translation (7 pages).

Han, S. et al., "Deep Compression: Compressing Deep Neural Networks with Pruning, Trained Quantization and Huffman Coding", Feb. 15, 2016, version v5, pp. 1-14, retrieved on Feb. 12, 2020, (URL: https://arxiv.org/abs/1510.00149v5), (URL: https://arxiv.org/pdf/1510.00149v5.pdf) (15 pages).

\* cited by examiner

FIG.9
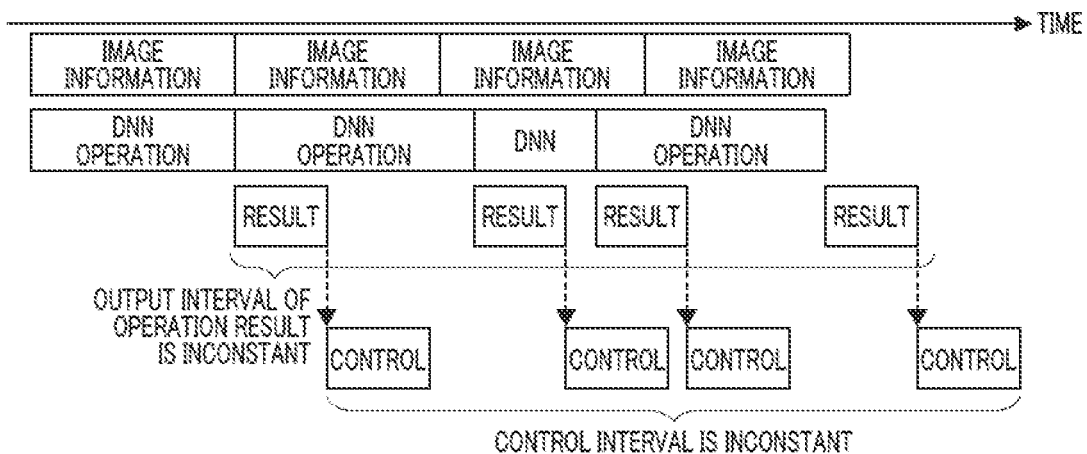
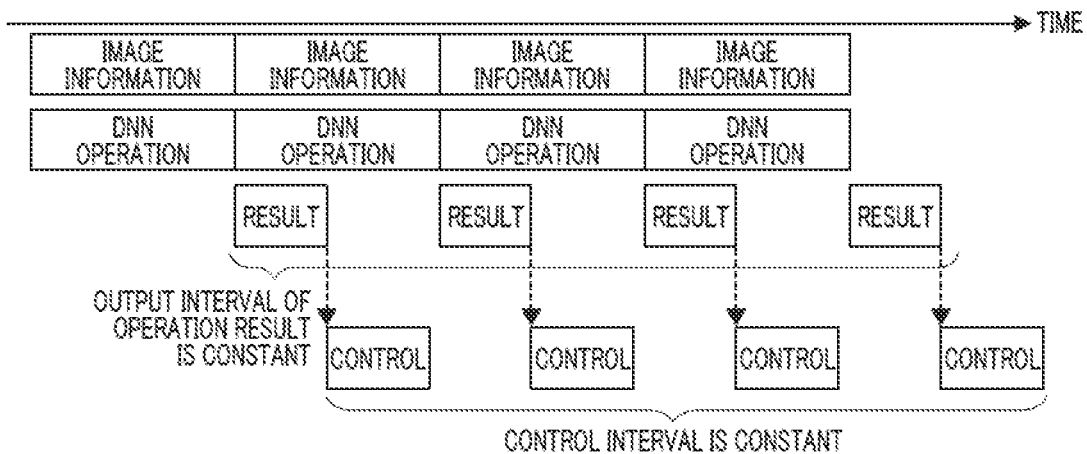

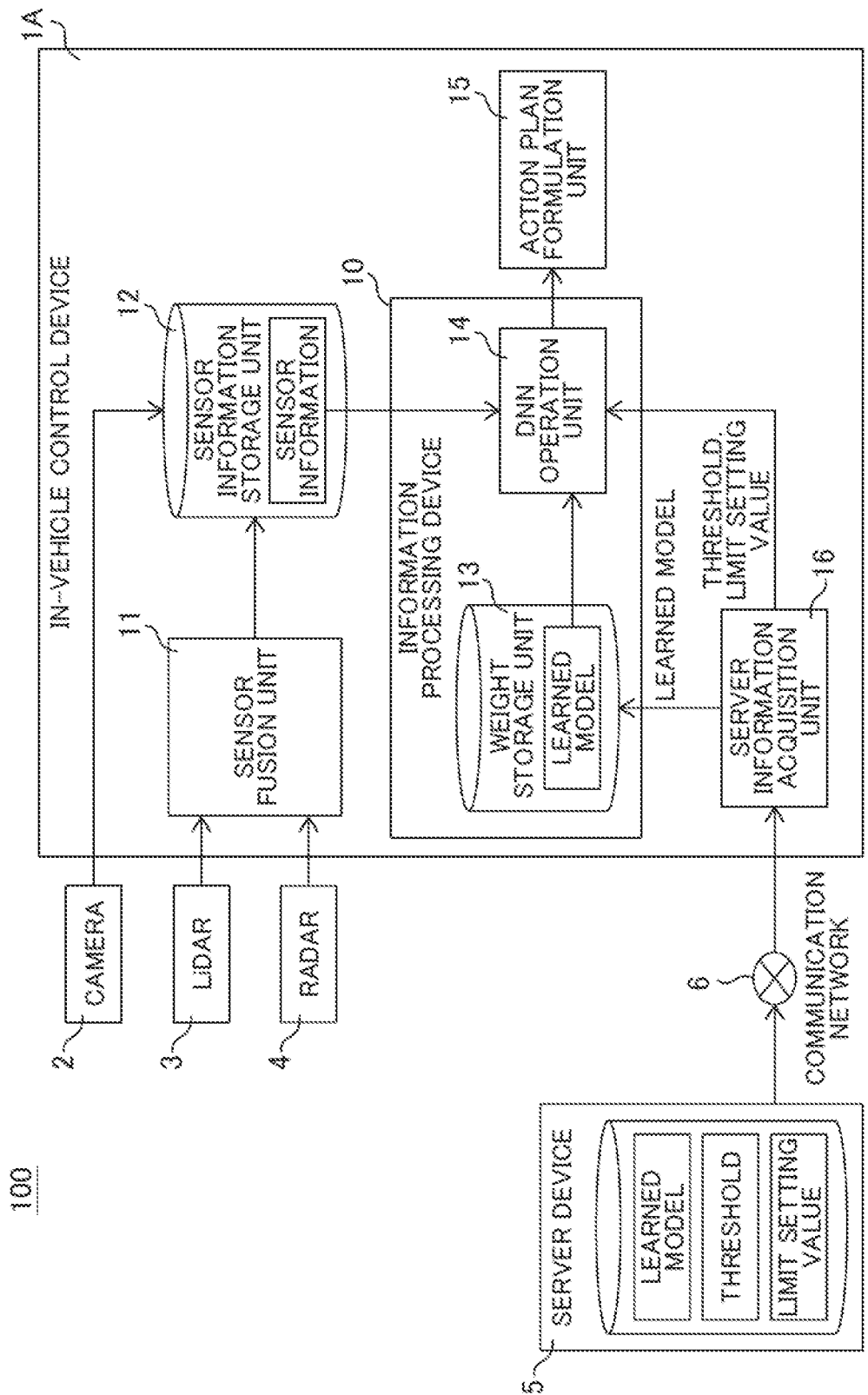

INFORMATION PROCESSING DEVICE, IN-VEHICLE CONTROL DEVICE, AND VEHICLE CONTROL SYSTEM

TECHNICAL FIELD

The present invention relates to an information processing device and an in-vehicle control device and a vehicle control system using the same.

BACKGROUND ART

A technique of recognizing the surrounding conditions of a vehicle from photographed images of a camera and information of various sensors to perform various driving supports based on the recognition result has been widely used from the past. In recent years, in order to obtain a highly accurate recognition result for complicated surrounding conditions in such a driving support technique for a vehicle, it has been proposed to perform an operation using a neural network that models the action of nerve cells in the human cerebrum.

In general, in order to obtain a highly accurate recognition result by using a neural network, a large amount of operation processing is required. For example, it has been known to perform about 100 billion to one trillion operations for one photographed image. However, it is not realistic to perform such a large amount of operation processing in a device mounted and used in a vehicle from the viewpoint of the size of the device and power consumption. Thus, there is a need for a technique capable of obtaining a highly accurate recognition result by using a neural network even with a small amount of operations.

As background art of the invention of the application, Patent Literature 1 has been known. Patent Literature 1 discloses a technique in which in an information processing device that detects a predetermined pattern in an input image by calculation processing using a hierarchical neural network configured by alternately arranging a detection layer for detecting and outputting one or more feature amounts from an output from the preceding layer and an integration layer for integrating and outputting outputs from the detection layer, data of output values of neurons in the detection layer is stored in a memory only for neurons whose output values are equal to or larger than a predetermined value, and an operation is performed for output values of neurons that are not stored in the memory by using a predetermined value instead.

CITATION LIST

Patent Literature

[Patent Literature 1] Japanese Unexamined Patent Application Publication No. 2005-346472

SUMMARY OF INVENTION

Technical Problem

In the technique of Patent Literature 1, when the input image changes, the output value of each neuron accordingly changes, and thus which output value of a neuron is stored in the memory is not constant. Thus, in order to appropriately process a variety of input images, it is necessary to configure the information processing device adapted for the assumed maximum operation amount, and the hardware cannot be simplified.

Solution to Problem

An information processing device according to the present invention includes a DNN operation unit that executes a DNN operation by a neural network including plural layers and a weight storage unit that stores a weight used in the DNN operation, and the DNN operation unit specifies data having a value larger than a predetermined threshold as operation target data among data input to a predetermined layer of the neural network, acquires a weight corresponding to the operation target data from the weight storage unit, and executes an operation of the predetermined layer based on the operation target data and the weight acquired from the weight storage unit.

An in-vehicle control device according to the present invention includes the information processing device and an action plan formulation unit that formulates an action plan for a vehicle, the information processing device is mounted in the vehicle, the DNN operation unit executes the DNN operation based on sensor information related to the surrounding conditions of the vehicle, and the action plan formulation unit formulates the action plan for the vehicle based on the operation result of the DNN operation unit.

A vehicle control system according to the present invention includes the in-vehicle control device and a server device that can communicate with the in-vehicle control device, the server device determines the threshold, and the in-vehicle control device determines resource distribution for the DNN operation unit based on the threshold determined by the server device.

Advantageous Effects of Invention

According to the present invention, it is possible to simplify the hardware in an information processing device that performs an operation using a neural network.

BRIEF DESCRIPTION OF DRAWINGS

FIG. 9 are diagrams each describing effects of the data output limiting in the third embodiment of the present invention.

FIG. 11 is a diagram for showing a configuration of a vehicle control system according to a fifth embodiment of the present invention.

DESCRIPTION OF EMBODIMENTS

First Embodiment

Figure 1:
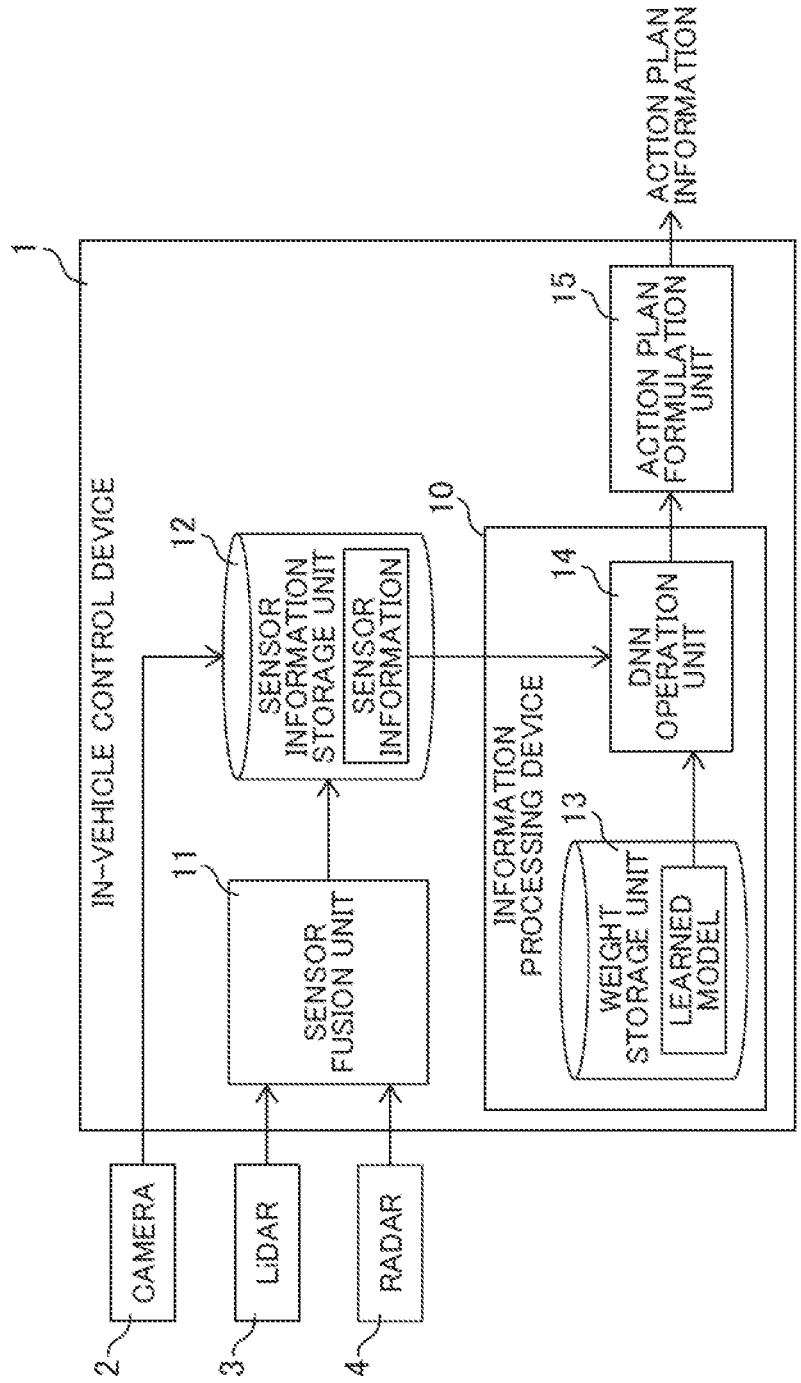
FIG. 1 is a diagram for showing a configuration of an in-vehicle control device according to an embodiment of the present invention.

FIG. 1 is a diagram for showing a configuration of an in-vehicle control device according to an embodiment of the present invention. An in-vehicle control device 1 shown in FIG. 1 is used by being mounted on a vehicle, and is connected to a camera 2, a LiDAR (Light Detection and Ranging) 3, and a radar 4, each of which functions as a sensor for detecting the surrounding conditions of the vehicle. A photographed image around the vehicle acquired by the camera 2 and distance information from the vehicle to an object therearound acquired by each of the LiDAR 3 and the radar 4 are input to the in-vehicle control device 1. Note that plural cameras 2, LiDARs 3, and radars 4 are mounted on the vehicle, and the photographed images and distance information acquired by each of the plural sensors may be input to the in-vehicle control device 1.

The in-vehicle control device 1 has each functional block of a sensor fusion unit 11, a sensor information storage unit 12, a weight storage unit 13, a DNN operation unit 14, and an action plan formulation unit 15. Each of the sensor fusion unit 11, the DNN operation unit 14, and the action plan formulation unit 15 is configured using, for example, an arithmetic processing circuit such as a CPU (Central Processing Unit), a GPU (Graphics Processing Unit), an FPGA (Field Programmable Gate Array), or an ASIC (Application Specific Integrated Circuit), or various programs used in combination therewith. In addition, each of the sensor information storage unit 12 and the weight storage unit 13 is configured using a storage device such as a RAM (Random Access Memory), an HDD (Hard Disk Drive), or a flash memory. Note that the weight storage unit 13 and the DNN operation unit 14 configure an information processing device 10 that performs information processing for recognizing the surrounding conditions of the vehicle.

Each of the photographed images and distance information input from the camera 2, the LiDAR 3, and the radar 4 is stored in the sensor information storage unit 12 as sensor information related to the surrounding conditions of the vehicle. Note that each distance information input from the LiDAR 3 and the radar 4 is integrated by sensor fusion processing of the sensor fusion unit 11, and then is stored in the sensor information storage unit 12. However, the sensor fusion processing is not necessarily performed. Note that information from other sensors may be stored in the sensor information storage unit 12 in addition to the sensor information, or only either of the photographed images and the distance information may be stored in the sensor information storage unit 12 as the sensor information.

The DNN operation unit 14 reads the sensor information (the photographed images or the distance information) from the sensor information storage unit 12, and executes a DNN (Deep Neural Network) operation for the read sensor information. The DNN operation performed by the DNN operation unit 14 is operation processing corresponding to a form of artificial intelligence, and realizes information processing conducted by the information processing device 10. When executing the DNN operation, the DNN operation unit 14 acquires necessary weight information from the weight storage unit 13. In the weight storage unit 13, weight information preliminarily calculated by a server (not shown) and updated based on learning results of the DNN operations performed so far by the DNN operation unit 14 is stored as a learned model. Note that details of the DNN operation unit 14 will be described later.

The action plan formulation unit 15 formulates an action plan for the vehicle based on the DNN operation result by the DNN operation unit 14, and outputs action plan information. For example, information for supporting a brake operation and a steering operation performed by the driver of the vehicle and information for automatic driving performed by the vehicle are output as the action plan information. The content of the action plan information output from the action plan formulation unit 15 is displayed on a display provided within the vehicle, or the action plan information is input to various ECUs (Electronic Control Units) mounted in the vehicle to be used for various vehicle controls. Note that the action plan information may be transmitted to a server or other vehicles.

Figure 2:
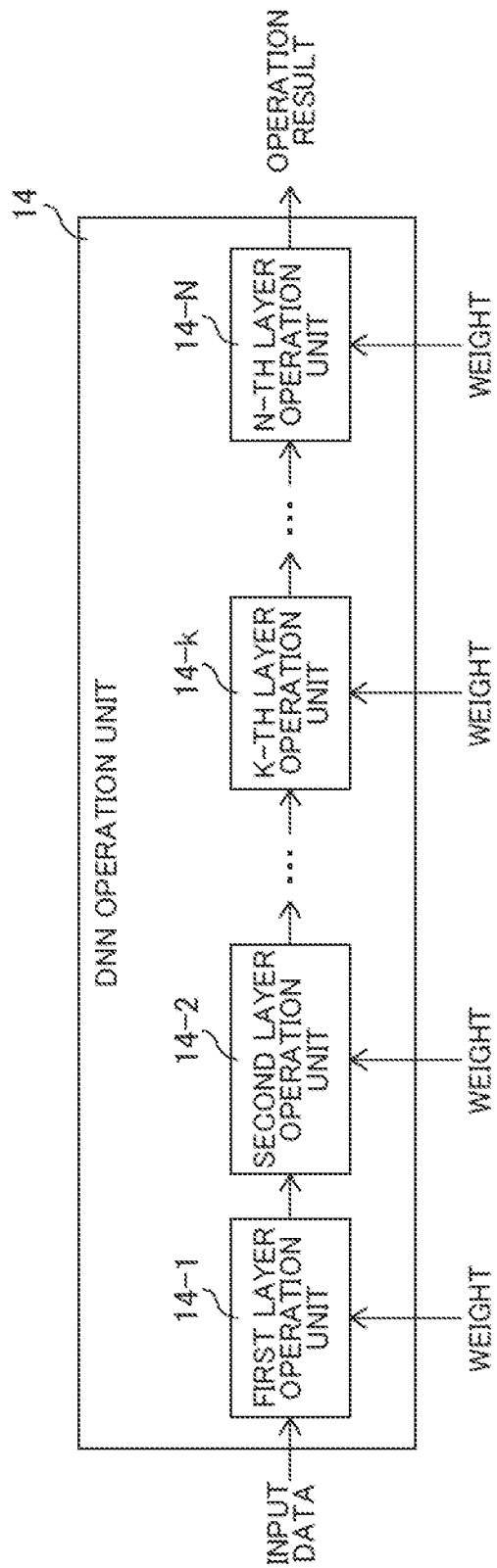
FIG. 2 is a schematic diagram of a DNN operation unit.

Next, the DNN operation unit 14 will be described. FIG. 2 is a schematic diagram of the DNN operation unit 14. As shown in FIG. 2, N operation units (however, N is a natural number equal to or larger than 3) from a first layer operation unit 14-1 to an N-th layer operation unit 14-N are arranged in layers in the DNN operation unit 14. That is, an N-layer neural network including the first layer operation unit 14-1, a second layer operation unit 14-2, , , , a k-th layer operation unit 14-k, , , , and the N-th layer operation unit 14-N is formed in the DNN operation unit 14. The DNN operation unit 14 sets weights to the operation units to execute a DNN operation, so that an operation result indicating a recognition result of the surrounding conditions of the vehicle is calculated based on the input data (sensor information) and is output. Note that among the operation units having N layers shown in FIG. 2, the head first layer operation unit 14-1 corresponds to an input layer and the last N-th layer operation unit 14-N corresponds to an output layer.

Figure 3:
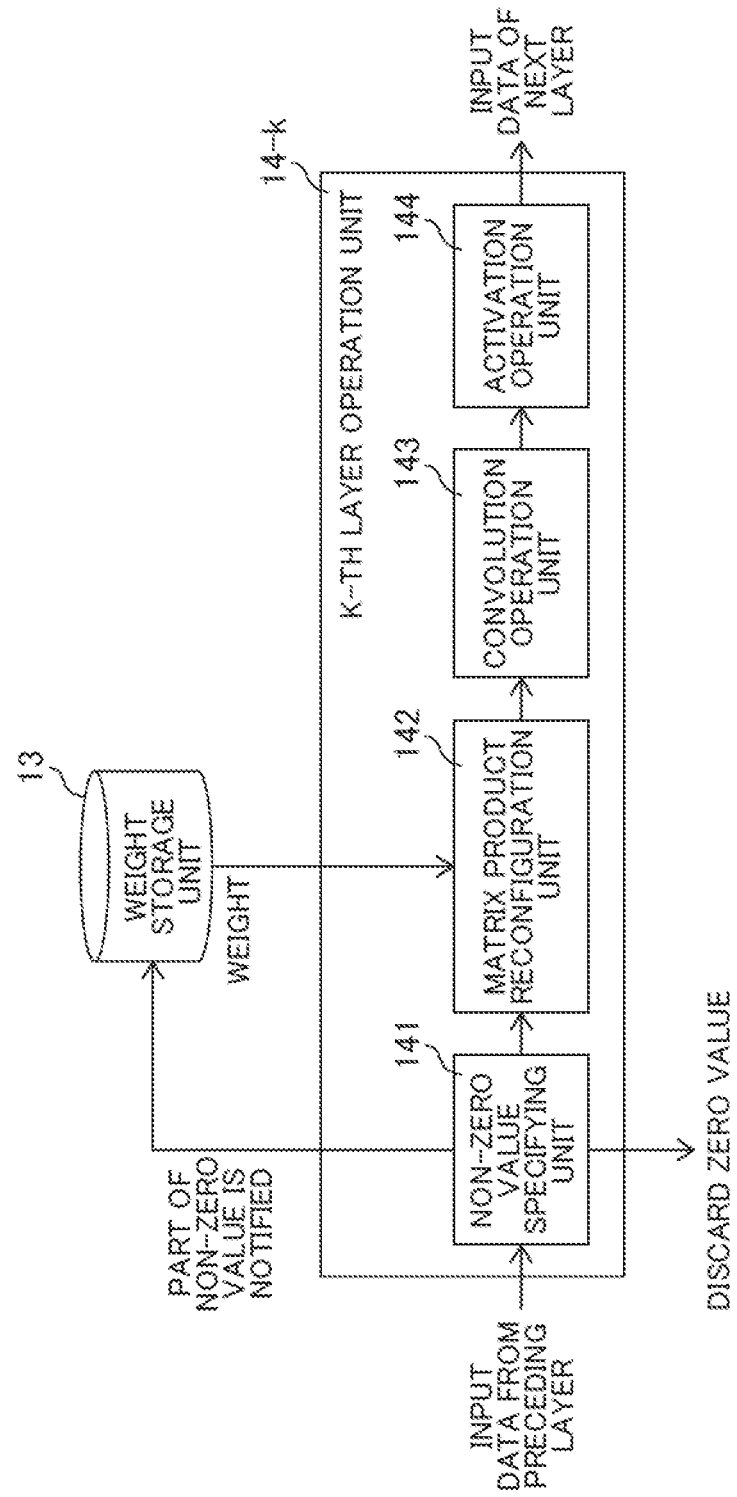
FIG. 3 is a functional block diagram of each operation unit of the DNN operation unit according to a first embodiment of the present invention.

FIG. 3 is a functional block diagram of each operation unit of the DNN operation unit 14 according to a first embodiment of the present invention. Note that since all of the first layer operation unit 14-1 to the N-th layer operation unit 14-N have the same functional configuration in the DNN operation unit 14, FIG. 3 shows functional blocks of the k-th layer operation unit 14-k as a representative of them. Hereinafter, all the operation units configuring the DNN operation unit 14 of the embodiment will be described by describing the functional blocks of the k-th layer operation unit 14-k.

The k-th layer operation unit 14-k has a non-zero value specifying unit 141, a matrix product reconfiguration unit 142, a convolution operation unit 143, and an activation operation unit 144.

The input data to the k-th layer operation unit 14-k from the preceding layer (the k−1-th layer) is input to the non-zero value specifying unit 141. The input data includes plural data values representing the operation result by the operation unit of the preceding layer, and some of the data values are set to 0 by an activation operation to be described later performed in the operation unit of the preceding layer. Note that in the case of the first layer operation unit 14-1, the sensor information read from the sensor information storage unit 12 is input to the non-zero value specifying unit 141 as input data from the preceding layer.

The non-zero value specifying unit 141 specifies the place of a data value having a non-zero value, that is, a value other than 0 among the plural data values included in the input data. Then, the specified place of the non-zero value in the input data is notified to the weight storage unit 13, and the data value of 0 is discarded from the input data. Accordingly, only the non-zero value in the input data is output from the non-zero value specifying unit 141 to the matrix product reconfiguration unit 142 as the subsequent operation target data. In other words, the non-zero value specifying unit 141 sets a threshold for the input data to 0, and specifies data having a value larger than the threshold (=0) as the subsequent operation target data.

The weight storage unit 13 stores weights for the respective data values of the input data. When receiving the notification of the place of the non-zero value from the non-zero value specifying unit 141, the weight storage unit 13 accordingly extracts and outputs a weight corresponding to the place of the non-zero value among the stored weights. Accordingly, the weight corresponding to the non-zero value specified by the non-zero value specifying unit 141 as the operation target data is output from the weight storage unit 13 and acquired by the matrix product reconfiguration unit 142.

The matrix product reconfiguration unit 142 reconfigures a matrix product for executing the operation of the k-th layer in the N-layer neural network in the DNN operation unit 14 based on the operation target data output from the non-zero value specifying unit 141 and the weight acquired from the weight storage unit 13. Here, a product sum operation expression of each data value of the operation target data output from the non-zero value specifying unit 141 and the weight acquired from the weight storage unit 13 is reconfigured as the matrix product of the k-th layer.

The convolution operation unit 143 performs a convolution operation for calculating the matrix product reconfigured by the matrix product reconfiguration unit 142. By the convolution operation performed by the convolution operation unit 143, the operation of the k-th layer is performed by the k-th layer operation unit 14-$k$.

The activation operation unit 144 performs an activation operation for activating the operation result of the convolution operation unit 143. Here, the activation operation is performed using, for example, an activation function called a ReLU (Rectified Linear Unit) function. The ReLU function is a function that outputs 0 for an input value smaller than 0, and outputs the input value as it is for a value equal to or larger than 0. Note that the activation operation may be performed using a function other than the ReLU function. Among the data values in the operation result of the convolution operation unit 143, the data value having less influence on the operation in the next layer (k+1 layer) is converted to 0 by the activation operation performed by the activation operation unit 144.

Each data value for which the activation operation was performed by the activation operation unit 144 is output from the k-th layer operation unit 14-$k$ to be input data of the next layer. As described above, the input data of the next layer includes the data value set to 0 by the activation operation.

Next, concrete operation processing of each operation unit in the DNN operation unit 14 will be described below with reference to FIG. 4. Note that as similar to FIG. 3, FIG. 4 shows concrete operation processing of the k-th layer operation unit 14-$k$ as a representative example among the first layer operation unit 14-1 to the N-th layer operation unit 14-N in FIG. 2.

Figure 4:
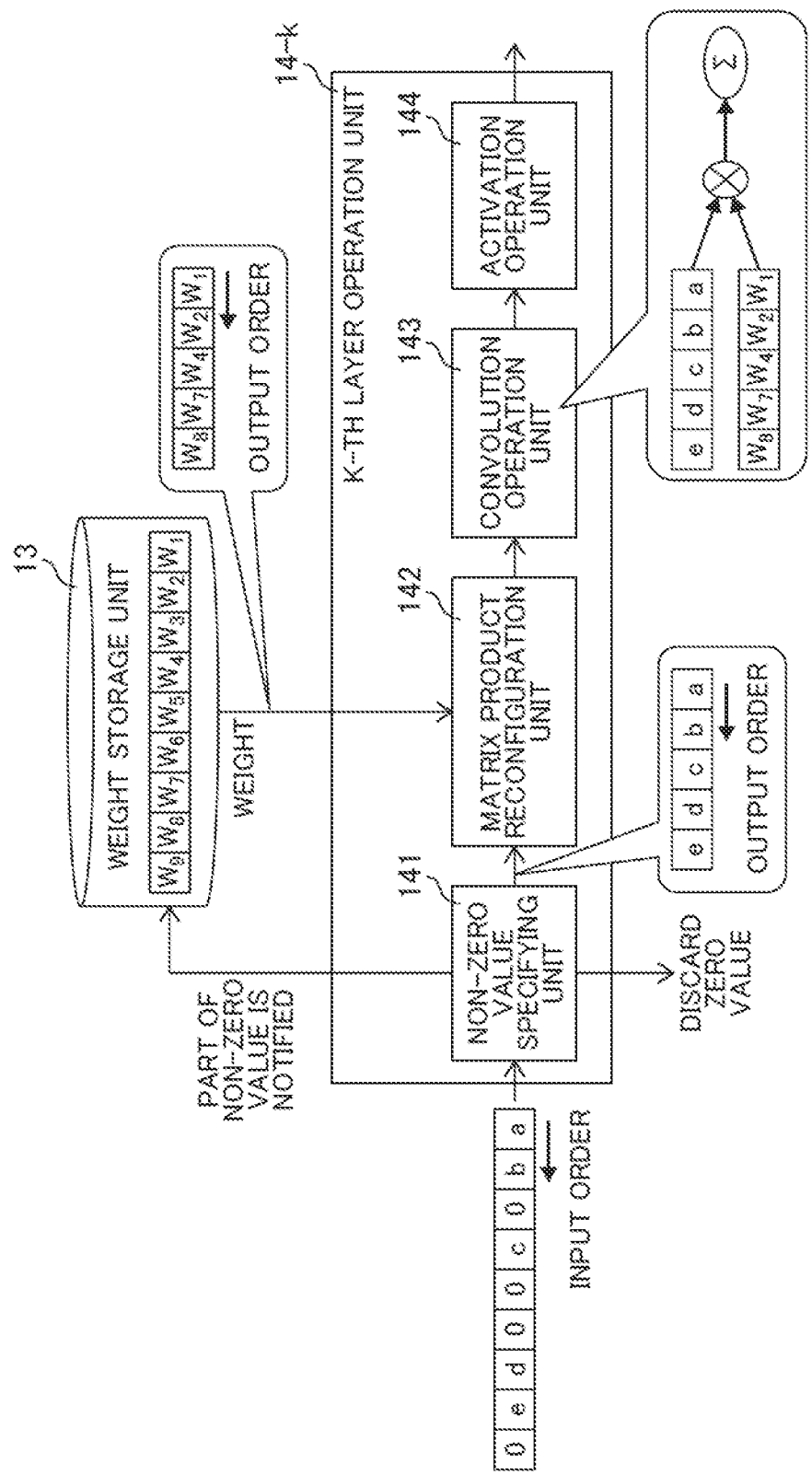
FIG. 4 is a diagram for describing concrete operation processing of each operation unit in the DNN operation unit.

It is assumed that as input data to the k-th layer operation unit 14-$k$ from the preceding layer, for example, nine data values are sequentially input as shown in FIG. 4. These data values include data values of a, b, c, d, and e having values other than 0 and four zero values. In this case, the non-zero value specifying unit 141 specifies each data value of a, b, c, d, and e as a non-zero value, notifies the weight storage unit 13 of these places, and sequentially outputs these data values to the matrix product reconfiguration unit 142 as the subsequent operation target data. That is, the non-zero value specifying unit 141 discards the four zero values among the nine data values included in the input data, and outputs only the remaining five non-zero values to the matrix product reconfiguration unit 142 as the operation target data.

The weight storage unit 13 stores nine weights w1 to w9 corresponding to the respective nine data values in the input data. When receiving the notification of the places of the non-zero values from the non-zero value specifying unit 141, the weight storage unit 13 extracts the weights w1, w2, w4, w7, and w8 corresponding to the respective notified data values of a, b, c, d, and e, and outputs the same to the matrix product reconfiguration unit 142.

The matrix product reconfiguration unit 142 reconfigures the product sum operation expression of the respective data values of a, b, c, d, and e output from the non-zero value specifying unit 141 as the operation target data and the weights w1, w2, w4, w7, and w8 acquired from the weight storage unit 13 as the matrix product of the k-th layer, and outputs the result to the convolution operation unit 143. The convolution operation unit 143 performs a product sum operation of the respective data values of a, b, c, d, and e and the weights w1, w2, w4, w7, and w8 based on the product sum operation expression output from the matrix product reconfiguration unit 142, and executes the operation of the k-th layer.

Since the product sum operation of each layer is executed by using all the data values included in the input data as the operation targets in the conventional DNN operation, when the input data includes the nine data values as described above, multiplication operations are required nine times in the product sum operation of each layer. Thus, if these multiplication operations are to be performed in parallel processing for speeding up, nine multipliers are required.

On the other hand, in the DNN operation by the DNN operation unit 14 according to the embodiment, since the product sum operation of each layer is executed using only the non-zero value as the operation target, the number of times of multiplication operations in the product sum operation of each layer can be reduced as compared to before. For example, when the input data includes the nine data values and four data values of them are zero as described above, the number of times of multiplication operations can be reduced from nine to five. Thus, parallel processing can be realized by only five multipliers, and the number of multipliers can be reduced as compared to before.

Note that in the DNN operation using the ReLU function as the activation function, it is generally known that approximately half of the data values after the activation operation is 0. Thus, in the DNN operation unit 14 of the embodiment, the number of multipliers to be allocated to the operations of each layer can be determined in advance according to the number of data values included in the input data of each layer. Accordingly, the hardware can be simplified while suppressing the deterioration in recognition accuracy.

According to the first embodiment of the present invention described above, the following effects are exhibited.

(1) The information processing device 10 includes the DNN operation unit 14 for executing a DNN operation by a neural network including plural layers and the weight storage unit 13 for storing weights used in the DNN operation. The DNN operation unit 14 specifies, as operation target data, data having a value larger than a predetermined threshold (zero) among data input to a predetermined layer of the neural network (non-zero value specifying unit 141), and acquires a weight corresponding to the operation target data from the weight storage unit 13 (matrix product reconfiguration unit 142). Then, based on the specified operation target data and the weight acquired from the weight storage unit 13, the operation of the predetermined layer is executed (convolution operation unit 143). Thereby, the hardware can be simplified in the information processing device 10 for performing an operation using the neural network.

(2) The in-vehicle control device 1 includes the information processing device 10 and the action plan formulation unit 15 for formulating an action plan for a vehicle. The information processing device 10 is mounted in the vehicle, and the DNN operation unit 14 executes a DNN operation based on the sensor information related to the surrounding conditions of the vehicle. The action plan formulation unit 15 formulates the action plan for the vehicle based on the operation result of the DNN operation unit 14. Thereby, the action plan for the vehicle can be appropriately formulated by using the operation result of the DNN operation unit 14.

Second Embodiment

Next, a second embodiment of the present invention will be described. In the embodiment, an example in which data in the vicinity of a zero value is excluded from operation target data in the DNN operation unit 14 will be described. Note that the configuration of the in-vehicle control device 1, the configuration of the information processing device 10, and the configuration of the DNN operation unit 14 in which N operation units are arranged in layers in the embodiment are the same as those described in each of FIGS. 1 and 2 in the first embodiment. Therefore, the description thereof will be omitted in the following.

Figure 5:
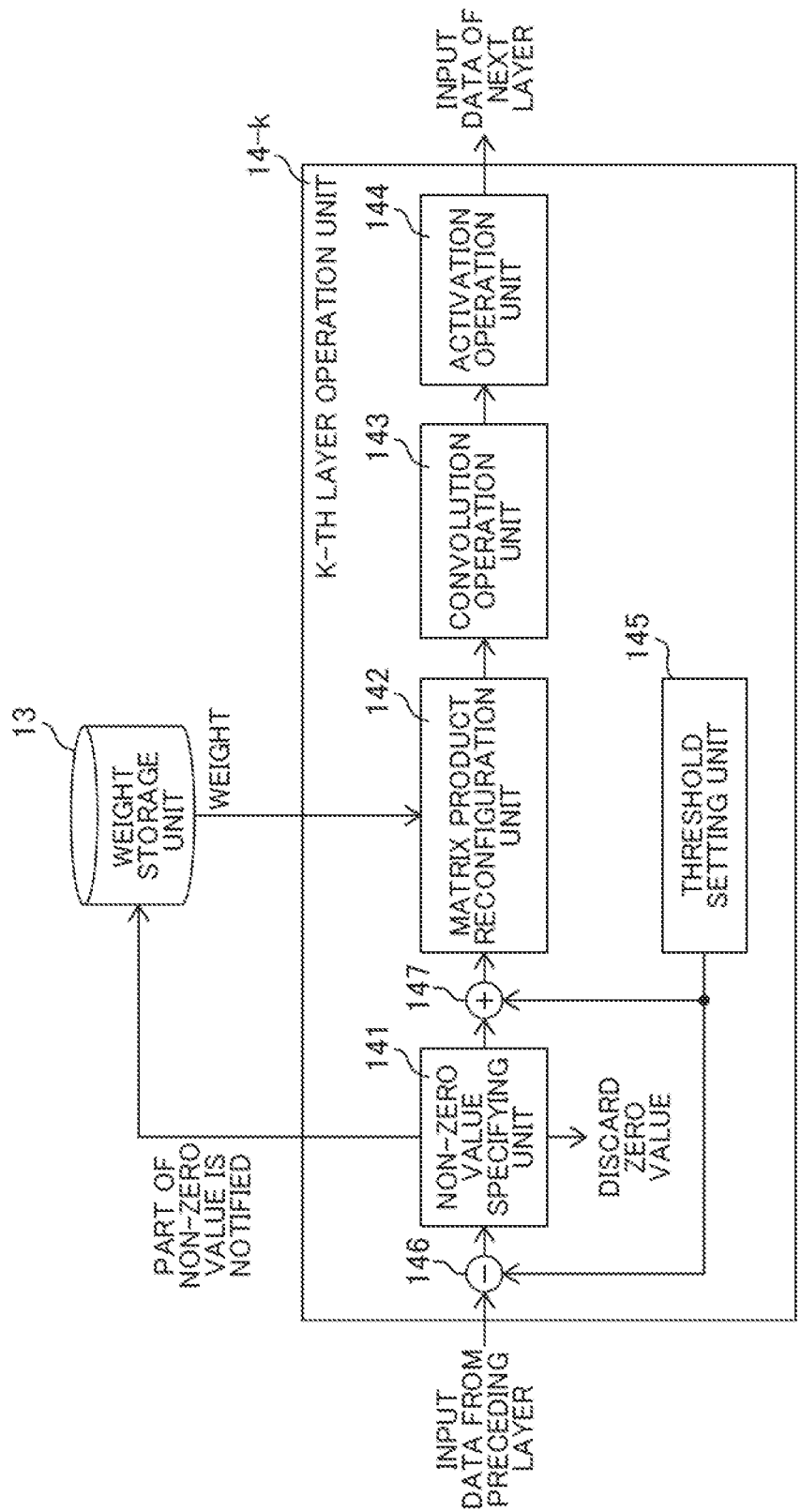
FIG. 5 is a functional block diagram of each operation unit of the DNN operation unit according to a second embodiment of the present invention.

FIG. 5 is a functional block diagram of each operation unit of the DNN operation unit 14 according to the second embodiment of the present invention. Note that since all of the first layer operation unit 14-1 to the N-th layer operation unit 14-N have the same functional configuration in the DNN operation unit 14 also in the embodiment as similar to the first embodiment, FIG. 5 shows functional blocks of the k-th layer operation unit 14-k as a representative of them. Hereinafter, all the operation units configuring the DNN operation unit 14 of the embodiment will be described by describing the functional blocks of the k-th layer operation unit 14-k.

In the embodiment, the k-th layer operation unit 14-k further has a threshold setting unit 145, a reverse bias setting unit 146, and a bias setting unit 147 in addition to the non-zero value specifying unit 141, the matrix product reconfiguration unit 142, the convolution operation unit 143, and the activation operation unit 144 described in the first embodiment.

The threshold setting unit 145 sets a threshold for the input data and notifies the reverse bias setting unit 146 and the bias setting unit 147. The reverse bias setting unit 146 applies a reverse bias to the input data by subtracting the threshold set by the threshold setting unit 145 from each data value included in the input data. The input data with the reverse bias applied by the reverse bias setting unit 146 is input to the non-zero value specifying unit 141.

As similar to the first embodiment, the non-zero value specifying unit 141 specifies the place of the non-zero value in the input data with the reverse bias applied, notifies the weight storage unit 13, and discards the data value of 0 from the input data. At this time, all the data values equal to or smaller than 0 are regarded as zero values and discarded. Then, the remaining data values without being discarded are specified as the subsequent operation target data, and are output to the bias setting unit 147.

The bias setting unit 147 applies a bias by adding the threshold set by the threshold setting unit 145 to each data value output from the non-zero value specifying unit 141. As a result, the reverse bias applied by the reverse bias setting unit 146 is eliminated, and the data is restored to the original values of the input data. However, the input data discarded by the non-zero value specifying unit 141 is not restored, and is not regarded as the subsequent operation target data. The operation target data restored to the original data values by the bias setting unit 147 is input to the matrix product reconfiguration unit 142. Accordingly, the input data having a value larger than the threshold is specified as the operation target data, and the operation processing same as that described in the first embodiment is executed.

Figure 6:
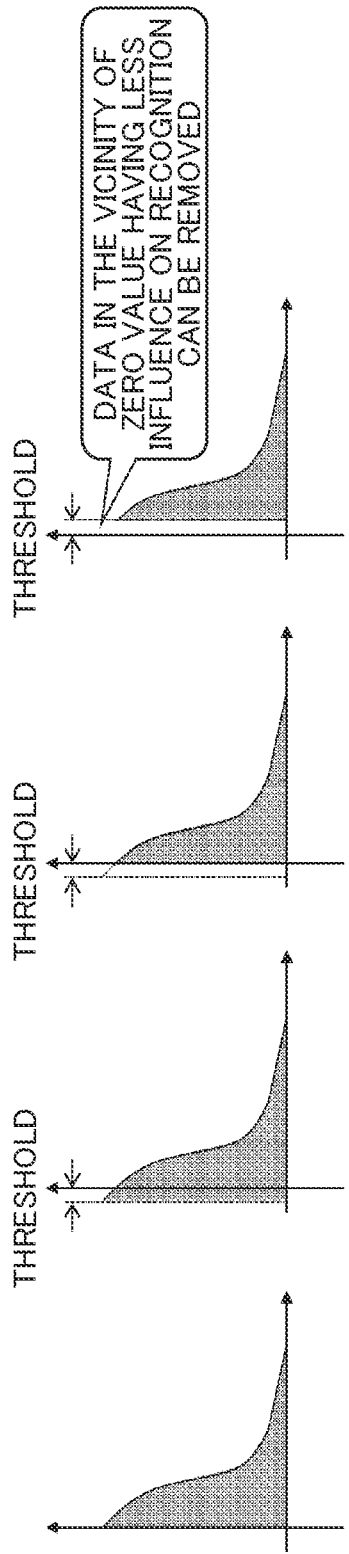
FIGS. 6A-6D are diagrams each describing an outline of operation target data in the second embodiment of the present invention.

FIG. 6 are diagrams each describing an outline of operation target data in the second embodiment of the present invention. For example, it is assumed that each data value having data distribution as shown in FIG. 6(a) is input as input data to the k-th layer operation unit 14-k shown in FIG. 5. In FIG. 6(a), the horizontal axis represents the magnitude of the data value, and the vertical axis represents the number of pieces of data. At this time, the reverse bias setting unit 146 applies a reverse bias to the input data by the threshold set by the threshold setting unit 145 as shown in FIG. 6(b), so that the data distribution of FIG. 6(a) is shifted in the minus direction.

The non-zero value specifying unit 141 regards all the data values equal to or smaller than 0 in the data distribution of FIG. 6(b) as zero values, and discards the same. Accordingly, as shown in FIG. 6(c), data distribution with the portion of 0 or smaller removed is formed.

As shown in FIG. 6(d), the bias setting unit 147 shifts the data distribution of FIG. 6(c) in the plus direction by applying a bias to the data with the zero values discarded by the non-zero value specifying unit 141 by the threshold set by the threshold setting unit 145. When the data distribution of FIG. 6(d) is compared to the original data distribution of FIG. 6(a), all the pieces of data equal to or smaller than the threshold are removed, and only the data having a value larger than the threshold is included. Accordingly, it can be understood that data in the vicinity of a zero value having less influence on recognition can be removed in the operation target data having the data distribution of FIG. 6(d).

Here, the threshold setting unit 145 can set an arbitrary threshold. For example, in the case where each pixel value of photographed images acquired by the camera 2 at a predetermined frame rate is input data to the DNN operation unit 14, the photographed images of each frame are mutually similar to each other between the preceding and subsequent frames. Thus, it is possible to set a threshold for the photographed image of the current frame, that is, the current data based on the operation result of the DNN operation unit 14 for the photographed image of the preceding frame, that is, the past input data. In addition, a different threshold may be set for each data value included in the input data. For example, it is possible to sequentially discard the data values having less influence on the operation result by increasing the threshold stepwise in accordance with the number of pieces of remaining data that can be set as the operation target data, that is, the number of remaining multipliers.

Other than this, a threshold is set by an arbitrary method, and data having a value larger than the threshold can be specified as the operation target data in each operation unit of the DNN operation unit 14. Note that the threshold may be changed for each layer of the DNN operation, that is, for each operation unit configuring the DNN operation unit 14.

According to the second embodiment of the present invention described above, the following effects are further exhibited in addition to those described in the first embodiment.

(3) The information processing device 10 further includes the threshold setting unit 145 for setting a threshold. The DNN operation unit 14 specifies, among the data input to a predetermined layer of the neural network, data having a value larger than the threshold set by the threshold setting unit 145 as the operation target data. Thereby, further improvement in processing performance and suppression of deterioration in recognition accuracy can be achieved while simplifying the hardware.

(4) The threshold setting unit 145 can set a threshold for the current data based on the operation result of the DNN operation unit 14 for the past data. In this way, it is possible to easily set an appropriate threshold for data input in time series such as the photographed images around the vehicle acquired at a predetermined frame rate.

Third Embodiment

Next, a third embodiment of the present invention will be described. In the embodiment, an example in which the operation time of the DNN operation unit 14 is within a fixed time will be described. Note that as similar to the second embodiment, the configuration of the in-vehicle control device 1, the configuration of the information processing device 10, and the configuration of the DNN operation unit 14 in which N operation units are arranged in layers in the embodiment are the same as those described in each of FIGS. 1 and 2 in the first embodiment. Therefore, the description thereof will be omitted in the following.

Figure 7:
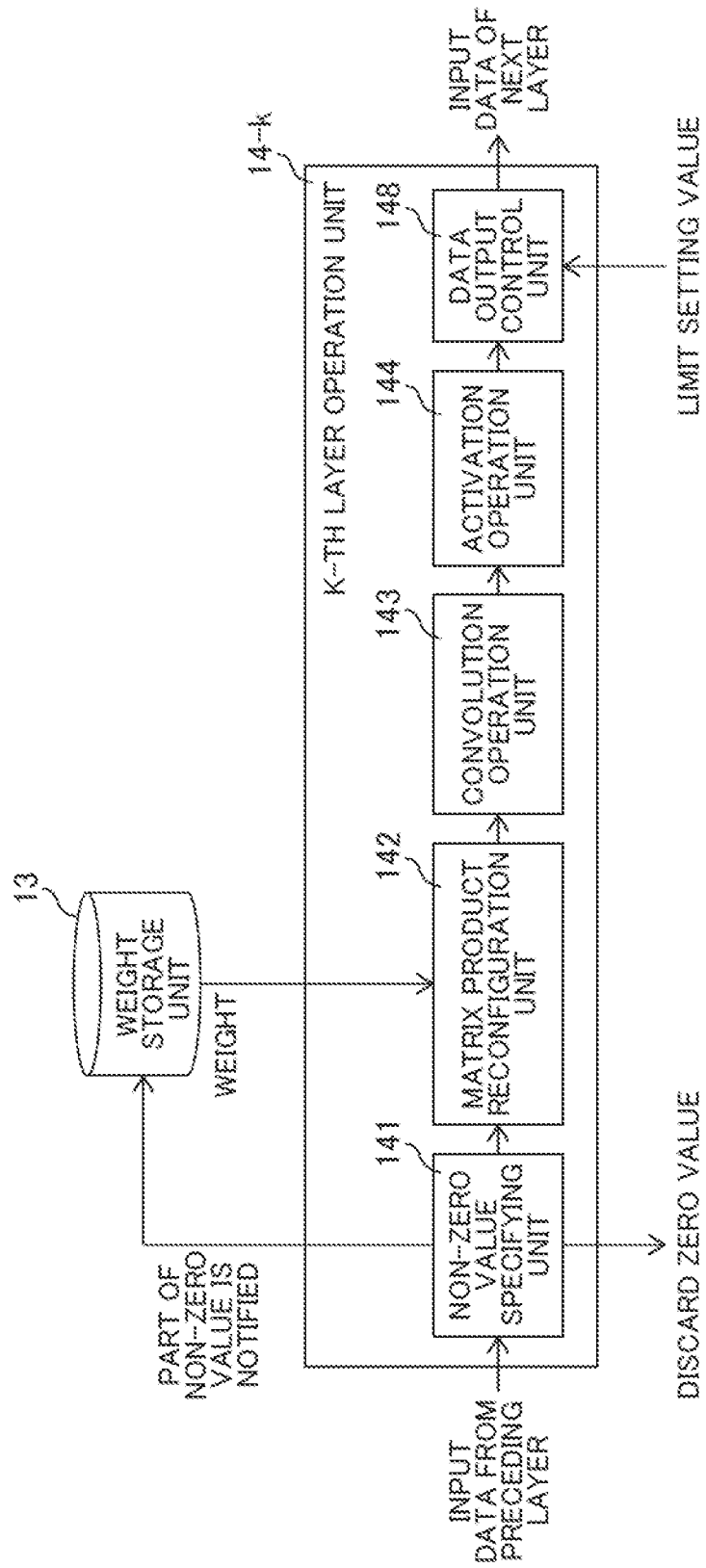
FIG. 7 is a functional block diagram of each operation unit of the DNN operation unit according to a third embodiment of the present invention.

FIG. 7 is a functional block diagram of each operation unit of the DNN operation unit 14 according to the third embodiment of the present invention. Note that since all of the first layer operation unit 14-1 to the N-th layer operation unit 14-N have the same functional configuration in the DNN operation unit 14 also in the embodiment as similar to the first and second embodiments, FIG. 7 shows functional blocks of the k-th layer operation unit 14-$k$ as a representative of them. Hereinafter, all the operation units configuring the DNN operation unit 14 of the embodiment will be described by describing the functional blocks of the k-th layer operation unit 14-$k$.

In the embodiment, the k-th layer operation unit 14-$k$ further has a data output limiting unit 148 in addition to the non-zero value specifying unit 141, the matrix product reconfiguration unit 142, the convolution operation unit 143, and the activation operation unit 144 described in the first embodiment.

The data output limiting unit 148 performs output limiting for each data value after the activation operation by the activation operation unit 144 based on a preset limit setting value. For example, the number of non-zero values among the data values after the activation operation is counted, and when the number of counts exceeds the limit setting value, all the remaining data values are replaced with 0. Accordingly, the output limiting of the data is performed so that the number of non-zero values in the data values included in the input data of the next layer becomes the limit setting value or smaller.

Figure 8:
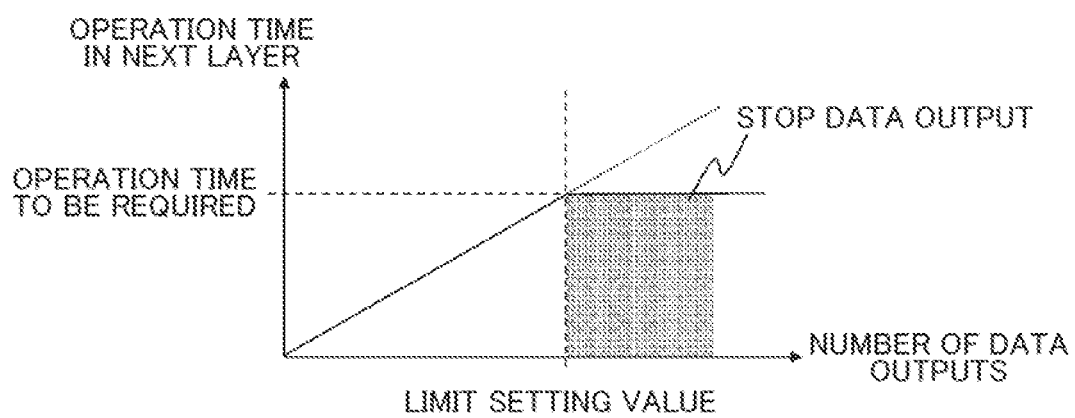
FIG. 8 is a diagram for describing an outline of data output limiting in the third embodiment of the present invention.

FIG. 8 is a diagram for describing an outline of data output limiting in the third embodiment of the present invention. In general, a proportional relationship as shown in FIG. 8 is established between the number of data outputs in each operation unit of the DNN operation unit 14 and the operation time in the next layer. That is, as the number of pieces of data of non-zero values in the input data of the next layer increases, the number of times of multiplication required for the operation of the next layer increases, and thus the operation time in the next layer becomes long. Since the change in the operation time in each operation unit affects the execution time of the DNN operation in the whole DNN operation unit 14, variations in the DNN operation time occur for each data. This leads to instability of vehicle control, and thus is not preferable.

Therefore, the output limiting of data as described above is performed using the data output limiting unit 148 in the embodiment. At this time, the limit setting value in accordance with the operation time required for the operation in the next layer is set to the data output limiting unit 148. Accordingly, as shown in FIG. 8, when the number of counts of non-zero values in the data after the activation operation exceeds the limit setting value, the data values are replaced with 0, and the subsequent data output is stopped. Thus, the number of outputs of data can be limited so that the operation time in the next layer does not exceed the operation time to be required.

FIG. 9 are diagrams each describing effects of the data output limiting in the third embodiment of the present invention. FIG. 9($a$) shows a relationship between the DNN operation time and the vehicle control timing when conventional data output limiting is not performed. In this case, since the length of the DNN operation time changes for each image information to be input, the timing at which the DNN operation result can be obtained also changes for each image information. As a result, the interval of the vehicle control performed based on the DNN operation result becomes inconstant, leading to the instability of the vehicle control.

FIG. 9($b$) shows a relationship between the DNN operation time and the vehicle control timing when the data output limiting according to the embodiment is performed. In this case, since the length of the DNN operation time is constant for each image information to be input, the timing at which the DNN operation result can be obtained also becomes constant. As a result, the interval of the vehicle control performed based on the DNN operation result becomes constant, and the vehicle control can be stably performed.

Note that the data output limiting unit 148 can select data as the output limit target based on various criteria. For example, the number of non-zero values is sequentially counted according to the operation order of each data, and when the number of counts exceeds the limit setting value, the data of the subsequent operation order can be set as the output limit target. In addition, the data as the output limit target may be selected based on the absolute value of each data or the magnitude of the weight corresponding to each data. For example, when each data is arranged in the order of magnitude of the absolute value or the corresponding weight, the data whose order exceeds the limit setting value can be set as the output limit target. Further, the data as the output limit target may be selected by combining them, or the data as the output limit target may be selected by using other criteria. If the number of pieces of data output from the data output limiting unit 148 can be limited to the limit setting value or smaller when the number of pieces of data that are non-zero values in the data after the activation operation exceeds the limit setting value, the data as the output limit target may be selected based on any criterion.

In addition, the limit setting value set to the data output limiting unit 148 may be changed for each layer of the DNN operation, that is, for each operation unit configuring the DNN operation unit 14. For example, the execution time of the DNN operation in the whole DNN operation unit 14 is defined and the operation time to be allocated to each layer in accordance with the operation load in each layer is set, so that the limit setting value of the data output limiting unit 148 in each operation unit can be defined. At this time, the limit setting value of each operation unit may be dynamically changed in accordance with the input data.

Further, the operation time in each operation unit may be directly measured without counting the number of pieces of data in the data output limiting unit 148, and when the measured operation time exceeds the limit setting value, the data output from the operation unit may be limited. For example, the operation time can be directly measured by counting the number of cycles of the operation processing in each operation unit.

According to the third embodiment of the present invention described above, the following effects are further exhibited in addition to those described in the first embodiment.

(5) The information processing device 10 further includes the data output limiting unit 148 that, when the number of pieces of data in the operation result of a predetermined layer of the neural network exceeds a predetermined limit setting value, limits the output of the operation result of the predetermined layer. Thereby, the control can be stabilized by making the output interval of the operation result constant.

(6) The data output limiting unit 148 can select the data as the output limit target based on at least one of the operation order of each data, the absolute value of each data, and the magnitude of the weight corresponding to each data in the operation result of a predetermined layer of the neural network. In this way, appropriate data can be set as the output limit target in consideration of the degree of influence on the DNN operation.

Fourth Embodiment

Next, a fourth embodiment of the present invention will be described. In the embodiment, an example of narrowing down the operation target data in consideration of the magnitude of the weight in the DNN operation unit 14 will be described. Note that as similar to the second and third embodiments, the configuration of the in-vehicle control device 1, the configuration of the information processing device 10, and the configuration of the DNN operation unit 14 in which N operation units are arranged in layers in the embodiment are the same as those described in each of FIGS. 1 and 2 in the first embodiment. Therefore, the description thereof will be omitted in the following.

Figure 10:
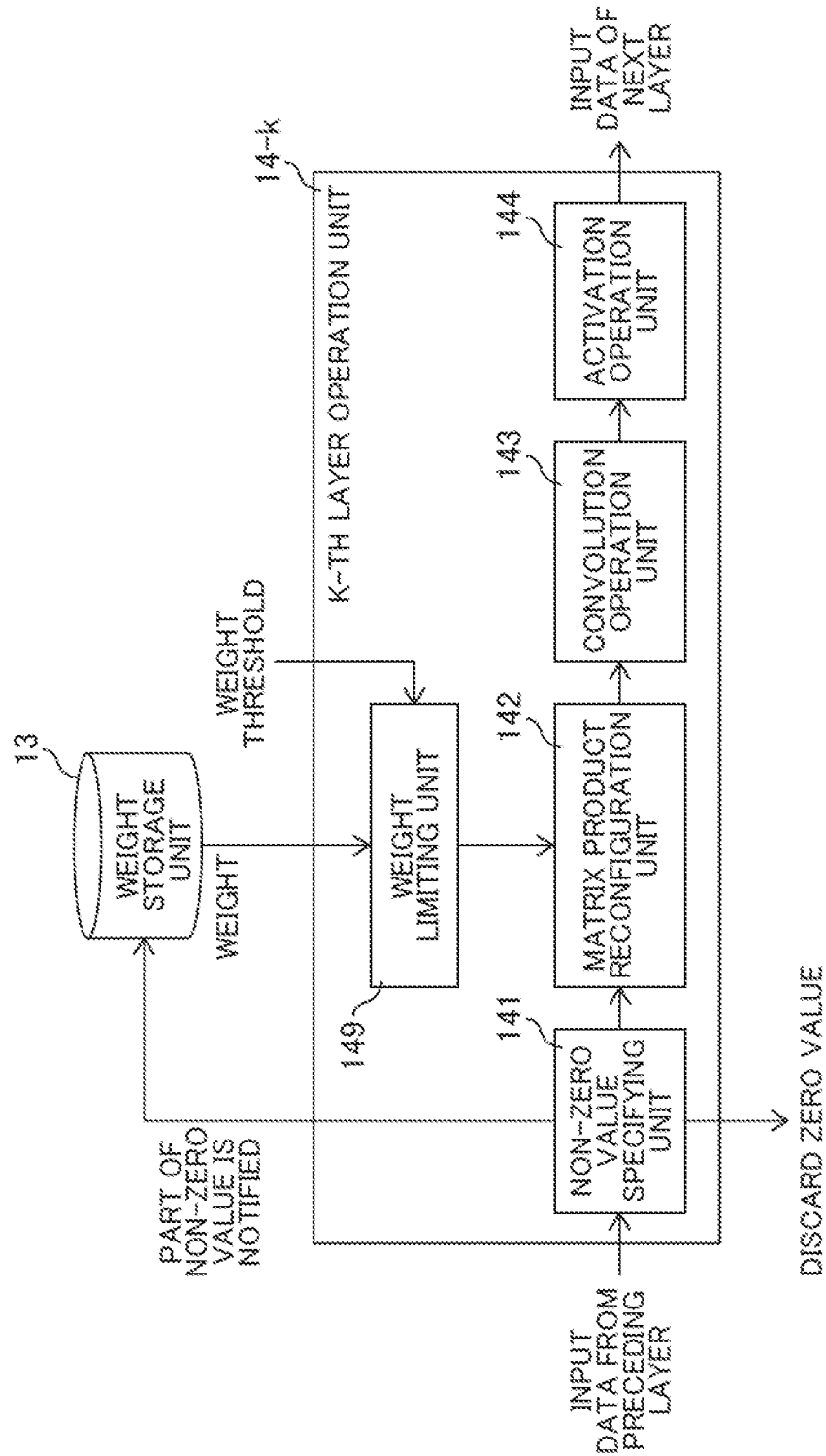
FIG. 10 is a functional block diagram of each operation unit of the DNN operation unit according to a fourth embodiment of the present invention.

FIG. 10 is a functional block diagram of each operation unit of the DNN operation unit 14 according to the fourth embodiment of the present invention. Note that since all of the first layer operation unit 14-1 to the N-th layer operation unit 14-N have the same functional configuration in the DNN operation unit 14 also in the embodiment as similar to the first to third embodiments, FIG. 10 shows functional blocks of the k-th layer operation unit 14-$k$ as a representative of them. Hereinafter, all the operation units configuring the DNN operation unit 14 of the embodiment will be described by describing the functional blocks of the k-th layer operation unit 14-$k$.

In the embodiment, the k-th layer operation unit 14-$k$ further has a weight limiting unit 149 in addition to the non-zero value specifying unit 141, the matrix product reconfiguration unit 142, the convolution operation unit 143, and the activation operation unit 144 described in the first embodiment.

The weight limiting unit 149 compares the weight of each operation target data acquired from the weight storage unit 13 with a preset weight threshold, and discards the weight that is smaller than the weight threshold without outputting to the matrix product reconfiguration unit 142. The matrix product reconfiguration unit 142 does not reconfigure the matrix product for the operation target data with the weight discarded by the weight limiting unit 149 among the operation target data output from the non-zero value specifying unit 141. Accordingly, the convolution operation unit 143 omits the convolution operation of the k-th layer based on the weight smaller than the threshold.

Here, an arbitrary weight threshold can be set to the weight limiting unit 149. Note that the weight threshold set to the weight limiting unit 149 may be changed for each layer of the DNN operation, that is, for each operation unit configuring the DNN operation unit 14. In addition, the weight threshold of each operation unit may be dynamically changed in accordance with the input data.

According to the fourth embodiment of the present invention described above, the following effects are exhibited in addition to those described in the first embodiment.

(7) When a weight acquired from the weight storage unit 13 is smaller than a predetermined weight threshold, the DNN operation unit 14 omits the operation of a predetermined layer based on the weight. Thereby, further improvement in processing performance and suppression of deterioration in recognition accuracy can be achieved while simplifying the hardware.

Fifth Embodiment

Next, a fifth embodiment of the present invention will be described. In the embodiment, an example in which a learned model and various setting values used in the DNN operation unit 14 are acquired from an external server device will be described.

FIG. 11 is a diagram for showing a configuration of a vehicle control system according to a fifth embodiment of the present invention. A vehicle control system 100 shown in FIG. 11 has an in-vehicle control device 1A and a server device 5. As similar to the in-vehicle control device 1 described in the first embodiment, the in-vehicle control device 1A is mounted and used in a vehicle, and is connected to the camera 2, the LiDAR 3, and the radar 4 as sensors. In addition, the in-vehicle control device 1A further includes a server information acquisition unit 16 in addition to the functional blocks of the sensor fusion unit 11, the sensor information storage unit 12, the weight storage unit 13, the DNN operation unit 14, and action plan formulation unit 15 described in the first embodiment.

The server device 5 is installed outside the vehicle in which the in-vehicle control device 1A is mounted, and can communicate with the in-vehicle control device 1A via a communication network 6. The server device 5 determines a learned model, thresholds for input data and weights, a limit setting value according to the operation time, and the like as information to be used in the in-vehicle control device 1A, and transmits these pieces of information to the in-vehicle control device 1A. Note that for example, a communication network for a mobile phone or a wireless LAN can be used for the communication network 6.

The server information acquisition unit 16 acquires the information transmitted from the server device 5, and outputs the same to the weight storage unit 13 and the DNN operation unit 14. For example, the learned model is output to the weight storage unit 13, and is stored in the weight storage unit 13. Accordingly, the DNN operation unit 14 can perform the DNN operation using the learned model created in the server device 5. Further, the threshold for the input data described in the second embodiment, the limit setting value described in the third embodiment, the weight threshold described in the fourth embodiment, and the like are output to the DNN operation unit 14. The DNN operation unit 14 can perform the processes as described in each of the second to fourth embodiments based on these pieces of information.

Further, the server information acquisition unit 16 may determine the resource distribution for the DNN operation unit 14 based on the threshold for the input data acquired from the server device 5. For example, when plural multipliers included in the DNN operation unit 14 are allocated to the operation unit of each layer, the number of multipliers to be allocated is changed in accordance with the magnitude of the threshold determined by the server device 5. Specifically, since the number of pieces of operation target data becomes smaller in a layer where a larger threshold is set, the number of multipliers to be allocated to the operation unit of the layer is reduced. On the contrary, since the number of pieces of operation target data becomes larger in a layer where a smaller threshold is set, the number of multipliers to be allocated to the operation unit of the layer is increased. In this way, the optimal resource distribution can be realized for the operation unit of each layer configuring the DNN operation unit 14.

According to the fifth embodiment of the present invention described above, the following effects are exhibited.

(8) The vehicle control system 100 includes the in-vehicle control device 1A and the server device 5 that can communicate with the in-vehicle control device 1A. The server device 5 determines a threshold for data input to a predetermined layer of the neural network. The in-vehicle control device 1A can determine the resource distribution for the DNN operation unit 14 based on the threshold determined by the server device 5. In this way, an arbitrary threshold can be easily set to the DNN operation unit 14, and appropriate resource distribution can be realized for the DNN operation unit 14 in accordance with the threshold.

Note that an example in which the information processing device 10 included in the in-vehicle control devices 1 and 1A mounted in the vehicle executes the DNN operation based on the sensor information related to the surrounding conditions of the vehicle and recognizes the surrounding conditions of the vehicle has been described in each embodiment described above, but the present invention is not limited thereto. The present invention can be applied to various information processing devices that execute a DNN operation by a neural network including plural layers.

Each of the embodiments and various modified examples described above is merely an example, and the present invention is not limited to these contents as long as the features of the invention are not impaired. In addition, each of the embodiments and various modified examples may be employed alone or arbitrarily combined. Further, although various embodiments and modified examples have been described above, the present invention is not limited to these contents. Other aspects conceivable within the scope of the technical idea of the present invention are also included within the scope of the present invention.

The content of the disclosure of the following application that forms the basis for priority is incorporated herein by reference.

Japanese patent application 2018-232687 (filed on Dec. 12, 2018)

LIST OF REFERENCE SIGNS 1, 1A in-vehicle control device
2 camera
3 LiDAR
4 radar
5 server device
6 communication network
10 information processing device
11 sensor fusion unit
12 sensor information storage unit
13 weight storage unit
14 DNN operation unit
15 action plan formulation unit
16 server information acquisition unit
141 non-zero value specifying unit
142 matrix product reconfiguration unit
143 convolution operation unit
144 activation operation unit
145 threshold setting unit
146 reverse bias setting unit
147 bias setting unit
148 data output limiting unit
149 weight limiting unit

The invention claimed is:

1. A vehicle control system comprising:
an in-vehicle control device comprising:
    an information processing device comprising:
        a DNN operation unit that executes a DNN operation by a neural network including plural layers; and
        a weight storage unit that stores a weight used in the DNN operation,
        wherein the DNN operation unit specifies data having a value larger than a predetermined threshold as operation target data among data input to a predetermined layer of the neural network, acquires a weight corresponding to the operation target data from the weight storage unit, and executes an operation of the predetermined layer based on the operation target data and the weight acquired from the weight storage unit;
    an action plan formulation unit that formulates an action plan for a vehicle,
    wherein the information processing device is mounted in the vehicle,
    wherein the DNN operation unit executes the DNN operation based on sensor information related to the surrounding conditions of the vehicle, and
    wherein the action plan formulation unit formulates the action plan for the vehicle based on the operation result of the DNN operation unit; and
a server device that can communicate with the in-vehicle control device,
wherein the server device determines the threshold, and
wherein the in-vehicle control device determines resource distribution for the DNN operation unit based on the threshold determined by the server device.

2. The vehicle control system of claim 1, wherein the information processing device has a threshold of 0.

3. The vehicle control system of claim 1, wherein the information processing device further comprises a threshold setting unit that sets the threshold,
wherein the DNN operation unit specifies data having a value larger than the threshold set by the threshold setting unit as the operation target data among the data input to the predetermined layer.

4. The vehicle control system of claim 3, wherein for the information processing device,
the threshold setting unit sets the threshold for the current data based on an operation result of the DNN operation unit for the past data.

5. The vehicle control system of claim 1, wherein the information processing device further comprises a data output limiting unit that, when the number of pieces of data in the operation result of the predetermined layer exceeds a predetermined limit setting value, limits the output of the operation result of the predetermined layer.

6. The vehicle control system of claim 5, wherein for the information processing device,
the data output limiting unit selects data as an output limit target based on at least one of the operation order of each data, the absolute value of each data, and the magnitude of the weight corresponding to each data in the operation result of the predetermined layer.

7. The vehicle control system of claim 1, wherein for the information processing device,
when the weight acquired from the weight storage unit is smaller than a predetermined weight threshold, the DNN operation unit omits the operation of the predetermined layer based on the weight.

* * * * *